United States Patent [19]

Haddock, Jr. et al.

[11] 4,429,761

[45] Feb. 7, 1984

[54] SEAT AND CONTROL LEVER INTERLOCK

[75] Inventors: Louis A. Haddock, Jr.; Ronald L. Jones, both of Battle Creek, Mich.

[73] Assignee: Clark Equipment Company, Buchanan, Mich.

[21] Appl. No.: 293,055

[22] Filed: Aug. 17, 1981

[51] Int. Cl.$^3$ .............................................. B60K 28/00

[52] U.S. Cl. ...................................... 180/271; 74/526; 180/68.5; 180/315; 296/65 R

[58] Field of Search ...................... 180/273, 68.5, 286, 180/287, 328, 271, 89.14, 315, 329, 326, 334, 69 R; 296/65 R; 297/331, 335; 74/526, 565, 591; 70/174; 292/196, 198; 49/31

[56] References Cited

U.S. PATENT DOCUMENTS 3,353,423 11/1967 Lehmann .............................. 74/526

3,610,359 10/1971 Becker ............................... 180/68.5

3,927,776 12/1975 Steiger ...................... 180/273

4,076,302 2/1978 Sable .................................. 297/331

4,238,008 12/1980 Higgins et al. ..................... 180/68.5

*Primary Examiner*—David M. Mitchell

*Attorney, Agent, or Firm*—John C. Wiessler

[57] ABSTRACT

A seat and hydraulic control lever interlock for lift trucks in which access to a battery compartment is in part enabled by pivoting the operator seat forwardly over the steering wheel, which pivotal movement causes interlocking lever means between the seat pivot and hydraulic control levers to actuate to an armed position. Forward pivotal movement of the control levers to an inoperative position to clear the battery compartment allows the lever means to move to a position in which the control levers are held in such inoperative position until the seat is pivoted rearwardly over the battery compartment.

8 Claims, 10 Drawing Figures

SEAT AND CONTROL LEVER INTERLOCK

BACKGROUND OF THE INVENTION

The field of art to which the invention pertains relates to industrial trucks, and more particularly to operator seat and control lever assembly for use on such vehicles.

Full and open access to the power source compartment of sit-down rider lift trucks for servicing and in particular replacement of power source batteries in electric trucks is an important part of the design of such lift trucks. Such components as the cover hood, hydraulic control levers and seat have been heretofore mounted for pivotal movement outside of the vertical cube of the source battery, for example, in such devices as are disclosed in co-pending U.S. applications Ser. No. 136,013, filed Mar. 31, 1980 now U.S. Pat. No. 4,312,418, and Ser. No. 209,748 filed Nov. 24, 1980 now U.S. Pat. No. 4,359,121, common assignee, and in U.S. Pat. Nos. 2,605,008, 3,610,359 and 4,076,302. Movement of the hood, seat and control valve bank to non-interfering positions is disclosed in the first named patent application, movement of the seat and hood to non-interfering positions is disclosed in the second named patent application, movement of valve control means to non-interfering positions in pedestrian and stand-up rider battery power lift trucks is disclosed in U.S. Pat. Nos. 2,605,008 and 3,610,359, and pivotal movement of the seat and overhead guard is shown in U.S. Pat. No. 4,076,302.

In none of such devices and combinations is the problem addressed of positively locking out of operative position lift truck control levers upon the pivotal actuation in a forward direction of the seat and control levers.

SUMMARY

The invention relates to a seat and hydraulic control lever interlock for lift trucks and the like in which access to a battery compartment is in part enabled by pivoting the operator seat forwardly over the steering wheel and by pivoting forwardly outside the vertical cube of the battery compartment hydraulic control levers. The seat movement actuates interlocking levers which maintains the forwardly pivoted inoperative position of the hydraulic control levers so long as the seat remains in such forwardly pivoted position, return to normal position of the seat enabling the control levers to be returned to operative position.

It is a principal object of the invention to provide in such lift trucks a positively maintained forward pivoted position of the control levers coordinated with a forward seat position so as to avoid interference with battery removal and to prevent movement of the control levers to operative positions.

DESCRIPTION OF PREFERRED EMBODIMENT

Figure 1:
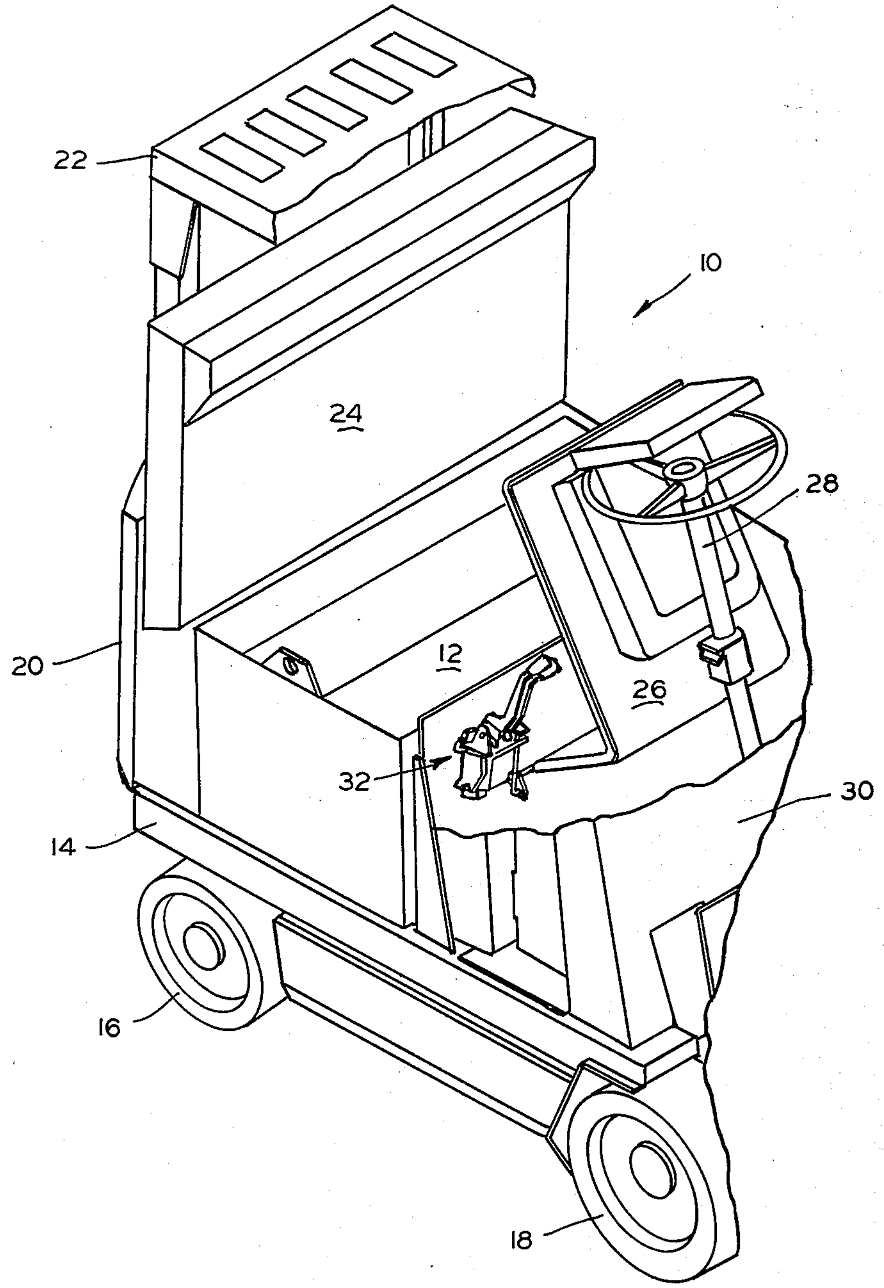
FIG. 1 is a partial view in perspective of an electric lift truck showing a hood device in a rearwardly pivoted position, and the steering post, operator seat and hydraulic control levers all in full forwardly pivoted positions.

A partial view of an industrial lift truck is illustrated at numeral 10 having a power source battery compartment 12 mounted on a frame 14 having pairs of steering and driving wheels 16 and 18, respectively, a counterweight 20, an overhead guard 22, a battery cover 24 shown in an upright position to expose the battery compartment, an operator's seat and supporting structure 26 illustrated in a forwardly pivoted position over a steering wheel and post 28, a front cowl 30 adapted to support an instrument panel, not shown, and a hydraulic valve and valve lever assembly 32, the lever assembly being illustrated in a forwardly pivoted and inoperative position. The upright or mast structure of the truck is not shown and certain of the above described components are located in positions which enables a power source battery in compartment 12 to be readily deposited therein or removed therefrom.

The seat support plate 26 normally extends upwardly and over a portion of the battery compartment (FIG. 2) and is secured at its lower edge, as by welding, to a support shaft 34 which is supported for rotation from a front body plate 36 by a pair of brackets 38, a torsion spring 40 being mounted on the one end of shaft 34 and having an upwardly extending spring leg member 42 which bears against the inside surface of the seat plate 26 and continuously urges it in a forwardly pivoted direction. When the seat is unoccupied it is tilted by spring 42 to a relatively small formed tilt position in which the truck operating systems, not shown, are rendered inoperative and the parking brake of the truck is engaged. An operator's manual device 44 is mounted from the seat plate and is adapted to disengage a seat latch, not shown, so that the seat may be pivoted fully forwardly as shown in FIGS. 1 and 3 for battery removal. A latch 46 is adapted to release the steering column for forward pivotal movement thereof as in FIG. 3 whereby to further open access to the battery compartment when the seat is pivoted forwardly over the steering wheel. The seat latch and means for rendering the truck systems inoperative upon forward tilting movement of the seat do not comprise a part of this invention and so have not been disclosed herein.

The hydraulic control valve and valve lever assembly 32 controls, for example, lift and tilt valves of an upright lift cylinder. It comprises a pair of valve levers 52 and 54, and a seat and control lever interlock assembly 56, the valve levers being connected to hydraulic valve means 58 enclosed within an enclosure 60 (FIG. 5) which is mounted from a valve lever support plate 61 which in turn is secured to the valve housing 62. The valve assembly 62 is secured by bolts, not shown, to body plate 36. The valve levers 52 and 54 extend upward through an opening 63 in enclosure 60 and are adapted to be actuated to various control positions; viz, a rearwardly extending position in which the seat is ordinarily occupied for operating the valve assembly 58 shown at 54*a*, a neutral position 54*b* which corresponds to the FIG. 2 position, and a forwardly pivoted position 54c which corresponds to the FIG. 3 position wherein the valve lever is held in a forwardly pivoted inoperative position by the control lever interlock 56 to be described, in which latter position the battery may be removed from or deposited in the battery compartment without interference by the valve levers.

Figures 4A, 4B, 4C:
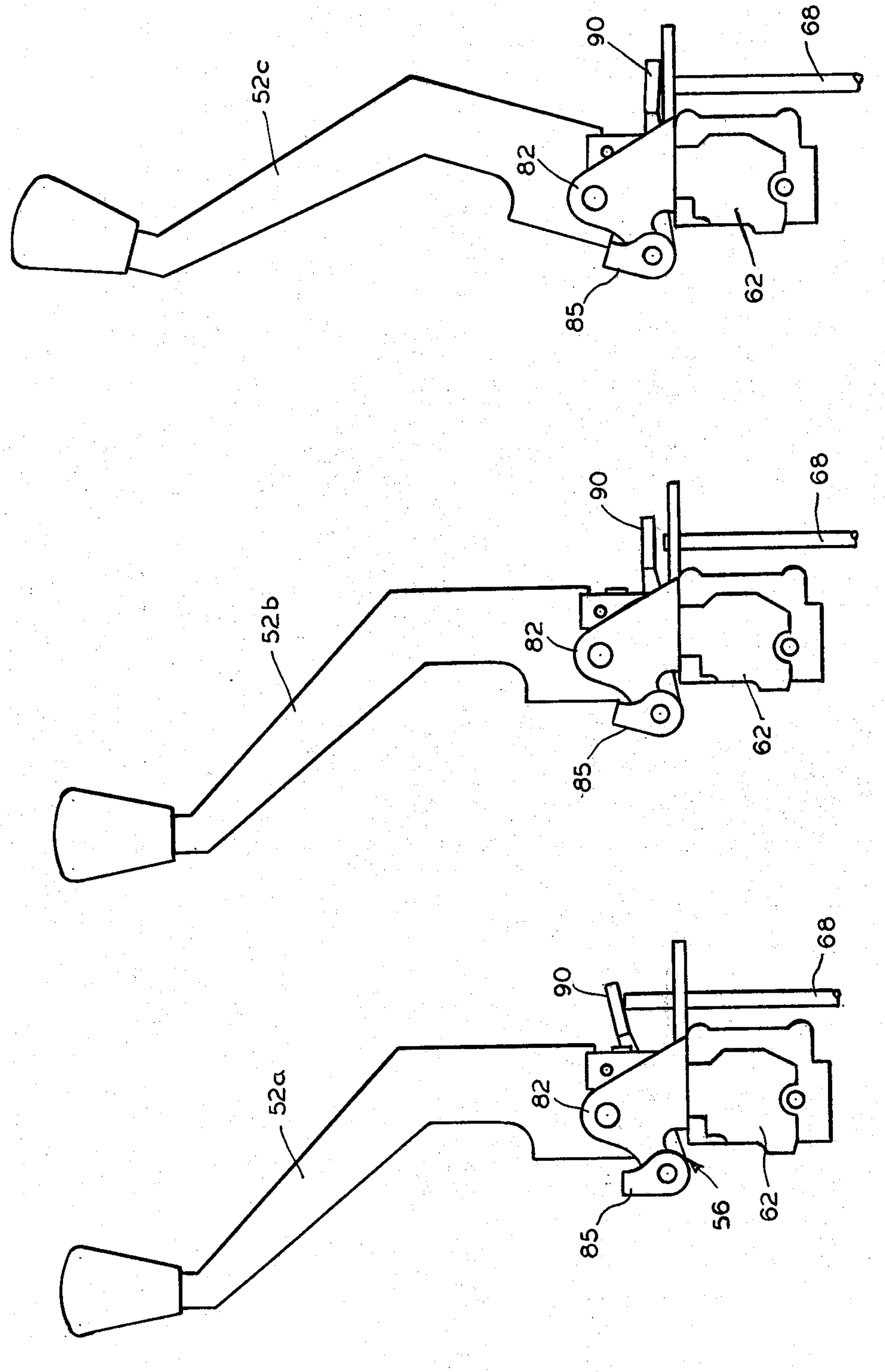
FIGS. 4A, 4B and 4C are right side partial broken-away views of one valve lever and adjacent associated parts shown in different positions of actuation.

The seat and control lever interlock 56 in its various operating positions is best shown in FIGS. 4A, 4B and 4C. With the seat in a normal slightly forwardly tilted position, the operator being off of the truck, the parts of the interlock assembly are as shown in FIG. 4B. In that position a lever 66 which is secured to the one end of pivot shaft 34 is positioned to maintain a control rod 68 connected thereto in the position shown which extends angularly and upwardly through an opening 70 in the housing 60 into contact with the one end of an interlock lever 72. The pair of slotted valve spools 58 project through support plate 61 for connection with complementary slots 78 in the valve levers, the valve levers being secured by a pin 80 in openings of spaced upwardly projecting ears 82 of the support plate 61, interlock lever 72 being pivotally supported on a pin 84 which extends through openings and ears 86 of the plate 61.

Figure 2:
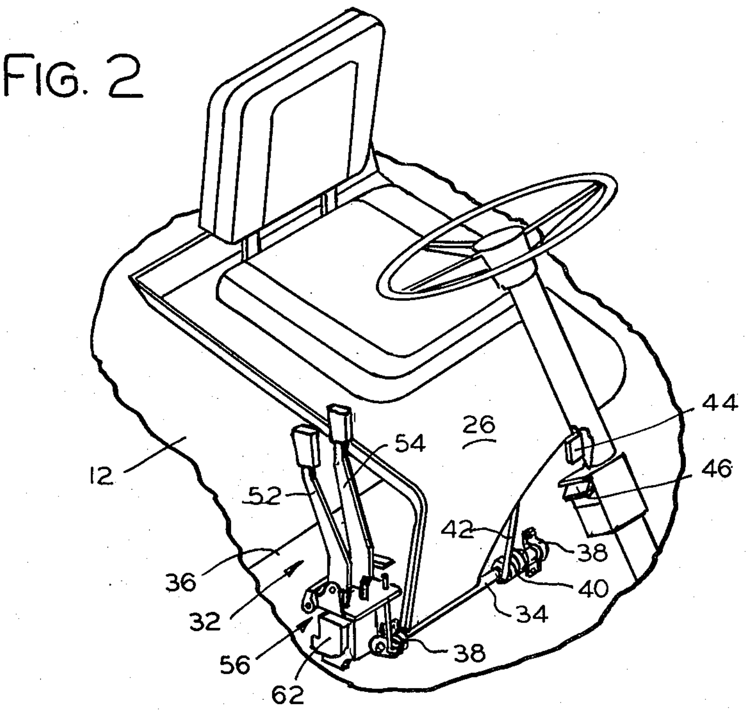
FIG. 2 is a partial view in perspective showing the seat, steering post and valve levers in normal unactuated and unoccupied positions.
Figure 3:
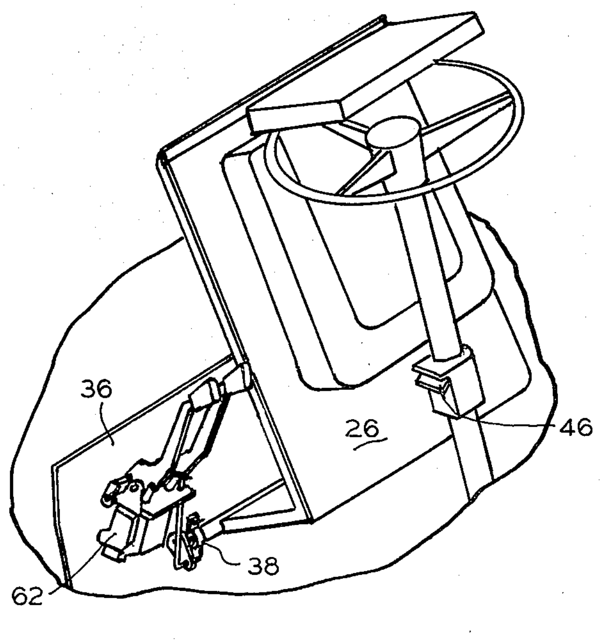
FIG. 3 is an enlarged partial view of FIG. 1.

When the seat is in its normally slightly forward tilted position with the operator off the seat, as shown in FIGS. 2 and 4B, the control rod 68 is actuated to a down position by lever 66 on seat support shaft 34 out of contact with arm 90 of interlock lever 72 so that the transverse interlock bar 72 falls forwardly of its own weight so as to contact the rear surfaces of valve levers 52 and 54 as shown in FIG. 4B. The interlock structure is thus "armed" to be actuated in either direction to either operate the valve spools from the position of FIG. 4A or lock out the valve control as in FIG. 4C wherein lever 72 has fallen into the position shown beneath control lever 52C. In other words, as indicated previously, for battery removal the steering post is pivoted forwardly, as well as the seat assembly and plate 26 to the position of FIGS. 2 and 4B, wherein rotation of the seat plate rotates support shaft 34 and lever 66 to thereby effect a lowering of control rod 68 as shown permitting the weight of interlock 72,90 to rotate it forwardly to a position wherein the interlock bar 72 thereof rests against the rear surface of the valve levers, or in a partially forward pivoted position. To complete the sequence of steps for preparation for battery removal the valve levers are rotated fully forwardly, as in FIG. 3, which permits the weight of the valve interlock 72,90 to pivot it further forwardly such that bar 72 pivots to the position of FIG. 4C wherein it is located beneath the rear lower surface of each valve lever thereby preventing operation of the levers in either direction, in which positions the valve levers are inoperative to operate the valves.

With the hood located in its illustrated vertical position shown in FIG. 1, the battery may now be removed from compartment 12, or deposited therein, following which a reversal of the sequence of movements of the hood 24, seat assembly, steering posts and valve members is effected, rearward pivotal movement of the seat assembly again effecting a raising of control rod 68 by lever 66 so as to actuate interlock bar 72 by upward movement of arm 90 to a non-interfering relation to the valve levers as in FIG. 4A thereby permitting subsequent operation thereof in either direction to operate the valves. Thus, the hydraulic valve levers which normally extend rearwardly over the front portion of the battery compartment may be positively maintained in a non-operative position fully forwardly of the battery compartment for deposit or removal of the battery without accidental actuation of the hydraulic valves associated therewith.

Although we have described and illustrated a preferred embodiment of our invention, it will be understood by those skilled in the art that modifications may be made in the structure, form, and relative arrangement of parts without necessarily departing from the spirit and scope of the invention. Accordingly, it should be understood that we intend to cover by the appended claims all such modifications which fall within the scope of the invention.

We claim:

1. In a lift truck having a power source compartment, an operator seat mounted forwardly of the compartment for forward pivotal movement from a normal position in which the seat extends over a portion of the compartment and operator control lever means adjacent the seat mounted for forward pivotal movement from a normal position in which the control lever means extends over a portion of the compartment, interlocking linkage means operatively connected between the seat and control lever means responsive to forward pivotal movement of said seat for maintaining said control lever means in a forwardly pivoted inoperative position following movement of the control lever means to said forwardly pivoted position, said seat being mounted pivotally from a transverse pivot shaft and said linkage means being operatively connected between said shaft and said control lever means, whereby forward pivotal movement of said seat rotates said shaft to cause actuation of said linkage means.

2. A lift truck as claimed in claim 1 wherein said linkage means includes a lever which is armed for maintaining said control lever means in said forwardly pivoted position upon forward pivotal movement of the seat and which upon subsequent forward pivotal movement of said control lever means moves to hold said control lever means in said forward pivoted position.

3. A lift truck as claimed in claim 1 wherein said linkage means includes a link actuatable by said pivot shaft in and out of operative interfering relation with a locking link which is adapted to move into holding relation with said control lever means when said latter means is pivoted forwardly to said inoperative position.

4. A lift truck as claimed in claims 1 or 3 wherein said seat and said control lever means are each pivotable forwardly independently of the other to inoperative positions outside of the vertical cube of the power source compartment in which positions said linkage means is effective to maintain the inoperative position of said control lever means.

5. A lift truck as claimed in claim 3 wherein said actuatable link is movable in one direction to actuate said locking link out of interfering relation with said control lever means and in another direction to permit movement of said locking link into interfering or holding relation with said control lever means subsequent to said forward pivotal movement of said control lever means.

6. A lift truck as claimed in claims 3 or 5 wherein said actuatable link is impositively connected to said locking link which is weighted to move from an armed position upon forward pivotal movement of said seat to a holding position upon forward pivotal movement of said control lever means.

7. A lift truck as claimed in claim 2 wherein said control lever means comprises a plurality of independently actuatable control levers, each of which is actuated to said forwardly pivoted position before said armed lever moves to hold said control levers in said forwardly pivoted positions.

8. A lift truck as claimed in claims 1 or 3 wherein said control lever means comprises a plurality of independently actuatable control levers, each of which must be actuated to forwardly pivoted positions before said linkage means is operative to move to hold said control levers in said forwardly pivoted positions.

* * * * *

UNITED STATES PATENT OFFICE
CERTIFICATE OF CORRECTION

PATENT NO. : 4,429,761

DATED : February 7, 1984

INVENTOR(S) : Louis A. Haddock, Jr. and Ronald L. Jones

Figure 5:
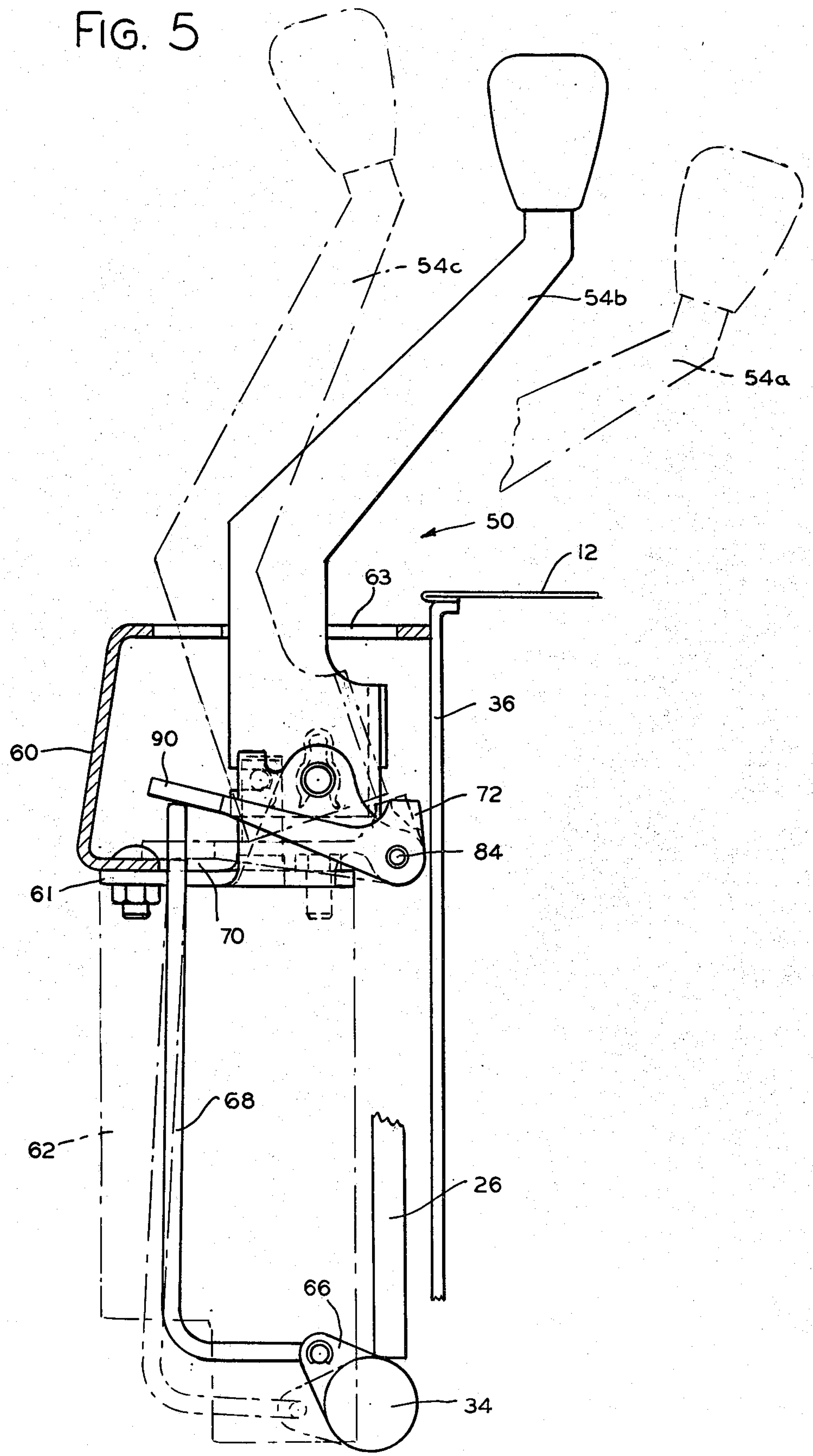
FIGS. 5A, 5B and 5C are left side broken-away and partial sectional views of one valve lever and associated parts shown in different positions of actuation.
Figure 6:
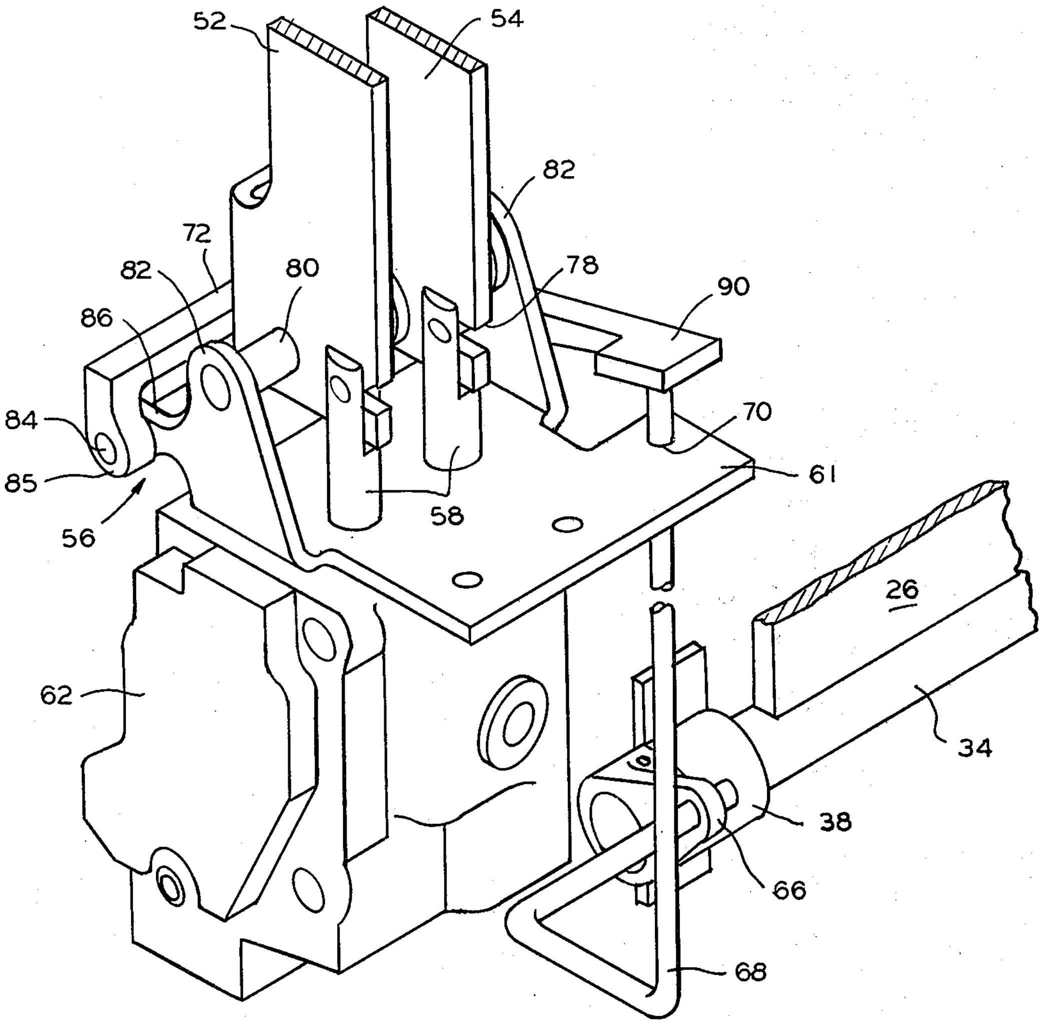
FIG. 6 is an enlarged perspective view of the control valve housing and adjacent parts.

It is certified that error appears in the above-identified patent and that said Letters Patent are hereby corrected as shown below:

Column 2, line 4, delete "FIGS. 5A, 5B and 5C are" and insert -- FIG. 5 is a --;
line 5, delete "views" and insert "view".

Signed and Sealed this

*Nineteenth* Day of *February 1985*

[SEAL]

*Attest:*

DONALD J. QUIGG

*Attesting Officer* *Acting Commissioner of Patents and Trademarks*